US012503340B2

(12) United States Patent
Sugahara et al.

(10) Patent No.: US 12,503,340 B2
(45) Date of Patent: Dec. 23, 2025

(54) CARRIER DEVICE

(71) Applicants: Mitsubishi Electric Corporation, Tokyo (JP); Tokyo Institute of Technology, Tokyo (JP)

(72) Inventors: Yusuke Sugahara, Tokyo (JP); Yukio Takeda, Tokyo (JP); Takahiro Ishii, Tokyo (JP); Takeshi Matsumoto, Tokyo (JP); Masayuki Kakio, Tokyo (JP)

(73) Assignees: MITSUBISHI ELECTRIC CORPORATION, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 18/278,183

(22) PCT Filed: Mar. 8, 2021

(86) PCT No.: PCT/JP2021/009051

§ 371 (c)(1),
(2) Date: Aug. 22, 2023

(87) PCT Pub. No.: WO2022/190179

PCT Pub. Date: Sep. 15, 2022

(65) Prior Publication Data

US 2024/0140760 A1 May 2, 2024

(51) Int. Cl.
*B66B 9/02* (2006.01)
*B66B 9/00* (2006.01)
(Continued)

(52) U.S. Cl.
CPC ................ *B66B 9/02* (2013.01); *B66B 9/003* (2013.01); *B66B 11/005* (2013.01); *B66B 11/0476* (2013.01)

(58) Field of Classification Search
CPC ......... B66B 11/005; B66B 9/02; B66B 9/003; B66B 11/0476; B66B 9/0807; B61B 13/04
See application file for complete search history.

(56) References Cited

U.S. PATENT DOCUMENTS 3,261,303 A * 7/1966 Summers ................ B61C 15/04 104/232
3,518,947 A * 7/1970 Borst ...................... B61B 12/02 105/154
(Continued)

FOREIGN PATENT DOCUMENTS

EP 0870718 A1 * 10/1998
JP H06-048672 A 2/1994
(Continued)

OTHER PUBLICATIONS

International Search Report mailed on Apr. 13, 2021, received for PCT Application PCT/JP2021/009051, filed on Mar. 8, 2021, 7 pages including English Translation.

*Primary Examiner* — Minh Truong
*Assistant Examiner* — Michelle M Mudwilder
(74) *Attorney, Agent, or Firm* — XSENSUS LLP

(57) ABSTRACT

To provide a drive device for a self-propelled elevator which is capable of moving a car in a vertical direction and a horizontal direction with a simple configuration. The drive device for a self-propelled elevator includes: a rotating body which is rotatably coupled to a back face of a cab; and wheels which are provided on the rotating body so as to sandwich guide surfaces of a rail on a back face side of the cab, which generate, by friction between the wheels and the rail, a force that moves the cab in a vertical direction when a longitudinal direction of the rail is the vertical direction, and which generate, by a friction force between the wheels and the rail, a force that moves the cab in a horizontal
(Continued)

direction when the longitudinal direction of the rail is the horizontal direction.

17 Claims, 15 Drawing Sheets

(51) Int. Cl.
*B66B 11/00* (2006.01)
*B66B 11/04* (2006.01)

(56) References Cited

U.S. PATENT DOCUMENTS 3,568,605 A * 3/1971 Pettit .................... B61B 12/002 105/154
3,658,155 A * 4/1972 Salter .................... B66B 9/022 198/798
3,698,326 A * 10/1972 Schurch .................. B61B 13/04 104/118
3,774,548 A * 11/1973 Borst .................... B61B 13/04 191/11
4,015,537 A * 4/1977 Graef .................... B61C 13/04 238/148
5,069,141 A * 12/1991 Ohara .................... B61C 13/04 105/152
5,572,930 A * 11/1996 Hein .................... B66B 9/0838 187/250
2001/0020429 A1* 9/2001 Serrano .................. B61B 13/00 105/141
2005/0236945 A1 10/2005 De Sousa Marreiros Alves
2007/0272494 A1* 11/2007 Kocher .................... B66B 9/02 187/350
2017/0107080 A1 4/2017 Steinhauer
2018/0201481 A1* 7/2018 King .................. B66B 11/0206
2022/0177273 A1* 6/2022 Wong .................... B66B 9/003
2022/0364380 A1 11/2022 Sugahara et al.

FOREIGN PATENT DOCUMENTS

JP 2009280313 A * 12/2009
JP 6517233 B2 5/2019
KR 10-2018-0053047 A 5/2018
WO 2018/142556 A1 8/2018
WO 2021/038731 A1 3/2021

* cited by examiner

CARRIER DEVICE

CROSS-REFERENCE TO RELATED APPLICATION

The present application is based on PCT filing PCT/JP2021/009051, filed Mar. 8, 2021, the entire contents of which are incorporated herein by reference.

FIELD

The present disclosure relates to a drive device for a self-propelled elevator.

BACKGROUND

PTL 1 discloses an elevator system. In the elevator system, a car moves in a vertical direction and a horizontal direction.

RELATED ART

Patent Literature

PTL 1: JP H6-48672 A

SUMMARY OF INVENTION

Problem to be Solved by the Invention

However, in the elevator system described in PTL 1, the car moves due to a drive force of a linear motor. Therefore, a system for moving the car is complicated.

The present disclosure has been made in order to solve the problem described above. An object of the present disclosure is to provide a drive device for a self-propelled elevator which is capable of moving a car in a vertical direction and a horizontal direction with a simple configuration.

Means to Solve the Problem

A drive device for a self-propelled elevator according to the present disclosure includes: a rotating body which is rotatably coupled to a back face of a cab; and wheels which are provided on the rotating body so as to sandwich guide surfaces of a rail on a back face side of the cab, which generate, by friction between the wheels and the rail, a force that moves the cab in a vertical direction when a longitudinal direction of the rail is the vertical direction, and which generate, by a friction force between the wheels and the rail, a force that moves the cab in a horizontal direction when the longitudinal direction of the rail is the horizontal direction.

Effect of the Invention

According to the present disclosure, a plurality of wheels are provided so as to sandwich guide surfaces of a rail. When a longitudinal direction of the rail is a vertical direction, the plurality of wheels generate a force that moves a cab in the vertical direction by friction between the wheels and the rail. When the longitudinal direction of the rail is a horizontal direction, the plurality of wheels generate a force that moves the cab in the horizontal direction by a friction force between the wheels and the rail. Therefore, a car can be moved in the vertical direction and the horizontal direction with a simple configuration.

DESCRIPTION OF EMBODIMENTS

Embodiments will be described in accordance with the accompanying drawings. In the respective drawings, same or equivalent portions will be denoted by same reference signs. Redundant descriptions of such portions will be simplified or omitted as deemed appropriate.

First Embodiment

Figure 1:
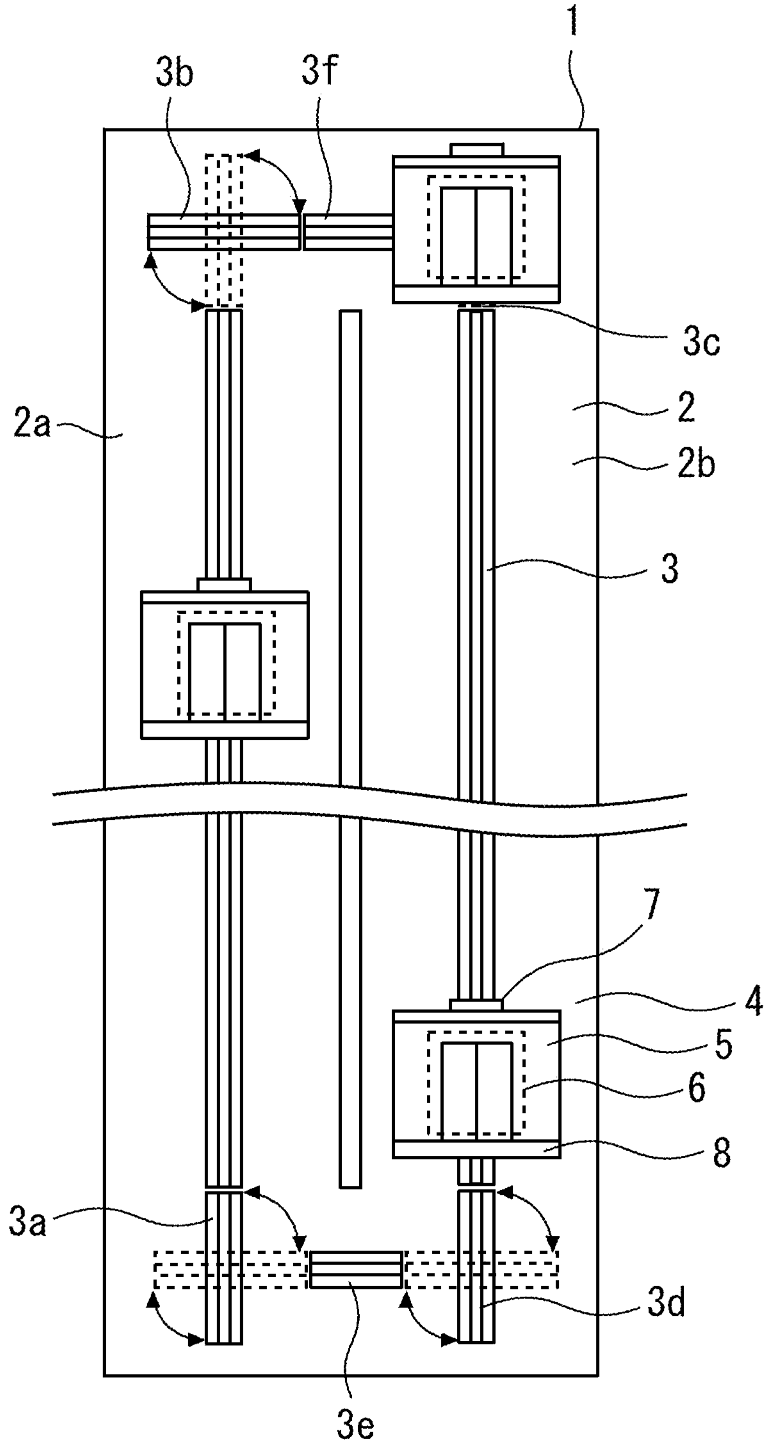
FIG. 1 is a configuration diagram of an elevator system to which a drive device for a self-propelled elevator according to a first embodiment is applied.

FIG. 1 is a configuration diagram of an elevator system to which a drive device for a self-propelled elevator according to a first embodiment is applied.

The elevator system shown in FIG. 1 is a system of a self-propelled elevator. The self-propelled elevator is a device which carries articles to be carried such as people and objects in a travel direction. For example, the travel direction is a vertical direction. For example, the travel direction is a diagonal direction which is inclined with respect to the vertical direction.

The self-propelled elevator does not require a rope for moving a car up and down. Therefore, a plurality of cars can run in one hoistway. As a building provided with elevators including ordinary rope-driven elevators becomes higher, a proportion of a hoistway in the building increases. Therefore, enabling a plurality of cars to run in one hoistway is effective in terms of reducing an area of the hoistway on a horizontal projection plane.

For example, an elevator 1 is provided in a building. The building has a plurality of floors. In the building, a hoistway 2 is provided so as to span a plurality of floors. The hoistway 2 is divided into a hoistway 2*a* and a hoistway 2*b*. In this example, the travel direction is the vertical direction.

One of a pair of rails 3 is stacked in the hoistway 2*a* with a longitudinal direction of the rail 3 being the vertical direction. The other of the pair of rails 3 is stacked in the hoistway 2*b* with a longitudinal direction of the rail 3 being the vertical direction.

A divided rail 3*a* is positioned below the one of the pair of rails 3. The divided rail 3*a* is provided so as to be rotatable by an actuator (not illustrated). The divided rail 3*a* is provided so as to be capable of maintaining its attitude when a longitudinal direction of the divided rail 3*a* is the vertical direction or the horizontal direction.

A divided rail 3*b* is positioned above the one of the pair of rails 3. The divided rail 3*b* is provided so as to be rotatable by an actuator (not illustrated). The divided rail 3*b* is provided so as to be capable of maintaining its attitude when a longitudinal direction of the divided rail 3*b* is the vertical direction or the horizontal direction.

A divided rail 3*c* is positioned above the other of the pair of rails 3. The divided rail 3*c* is provided so as to be rotatable by an actuator (not illustrated). The divided rail 3*c* is provided so as to be capable of maintaining its attitude when a longitudinal direction of the divided rail 3*c* is the vertical direction or the horizontal direction.

A divided rail 3*d* is positioned below the other of the pair of rails 3. The divided rail 3*d* is provided so as to be rotatable by an actuator (not illustrated). The divided rail 3*d* is provided so as to be capable of maintaining its attitude when a longitudinal direction of the divided rail 3*d* is the vertical direction or the horizontal direction.

A horizontal rail 3*e* is positioned in a lower part of the hoistway 2 with a longitudinal direction of the horizontal rail 3*e* being the horizontal direction. The horizontal rail 3*e* is positioned so as to straddle a lower part of the hoistway 2*a* and a lower part of the hoistway 2*b*. One side of the horizontal rail 3*e* is provided so as to be smoothly connectable to the divided rail 3*a* when the longitudinal direction of the divided rail 3*a* is the horizontal direction. The other side of the horizontal rail 3*e* is provided so as to be smoothly connectable to the divided rail 3*d* when the longitudinal direction of the divided rail 3*d* is the horizontal direction.

A horizontal rail 3*f* is positioned in an upper part of the hoistway 2 with a longitudinal direction of the horizontal rail 3*f* being the horizontal direction. The horizontal rail 3*f* is positioned so as to straddle an upper part of the hoistway 2*a* and an upper part of the hoistway 2*b*. One side of the horizontal rail 3*f* is provided so as to be smoothly connectable to the divided rail 3*b* when the longitudinal direction of the divided rail 3*b* is the horizontal direction. The other side of the horizontal rail 3*f* is provided so as to be smoothly connectable to the divided rail 3*c* when the longitudinal direction of the divided rail 3*c* is the horizontal direction.

The elevator 1 includes two or more cars 4. For example, the elevator 1 may include three or more cars 4 in the hoistway 2*a* and the hoistway 2*b*.

The car 4 includes a cab 5, a drive device 6, and a control unit 7.

The cab 5 has, therein, a space for loading articles to be carried. The cab 5 has a car platform 8. The car platform 8 is a bottom surface of the cab 5. The car platform 8 supports a load of the articles to be carried which are loaded onto the cab 5.

The drive device 6 is a device which generates a drive force for moving the cab 5 up and down. The drive device 6 is provided on a back face side of the cab 5 on an opposite side to a hall where users board and alight from the cab 5. The drive device 6 grips the rail 3. The drive device 6 moves the cab 5 up and down by a friction force between the drive device 6 and the rail 3.

The control unit 7 is a portion which controls motions of the car 4. For example, the control unit 7 is positioned in an upper part of the cab 5. For example, the control unit 7 is positioned in a lower part of the car 4. For example, the control unit 7 is positioned at a location other than an upper part and a lower part in the car 4. For example, the control unit 7 is positioned by being divided into a plurality of portions.

In this example, the cab 5 moves up and down the hoistway 2*a* or the hoistway 2*b*. The cab 5 moves between the hoistways 2*a* and 2*b* in the upper part or the lower part of the hoistway 2.

For example, the cab 5 reaches the divided rail 3*b* by ascending while being guided by the rail 3 via the drive device 6 in the hoistway 2*a*. Subsequently, the divided rail 3*b* and the divided rail 3*c* rotate by 90 degrees so that the longitudinal direction changes from the vertical direction to the horizontal direction. Subsequently, the cab 5 is guided by the divided rail 3*b* via the drive device 6 and moves in the horizontal direction. Subsequently, the cab 5 is guided by the horizontal rail 3*f* via the drive device 6 and moves in the horizontal direction. Subsequently, the cab 5 reaches the divided rail 3*c* via the drive device 6. Subsequently, the divided rail 3*b* and the divided rail 3*c* rotate by 90 degrees so that the longitudinal direction changes from the horizontal direction to the vertical direction. Subsequently, the cab 5 reaches the rail 3 by descending while being guided by the divided rail 3*c* via the drive device 6 in the hoistway 2*b*.

Next, the rail 3 and the car 4 will be described with reference to FIG. 2.

Figure 2:
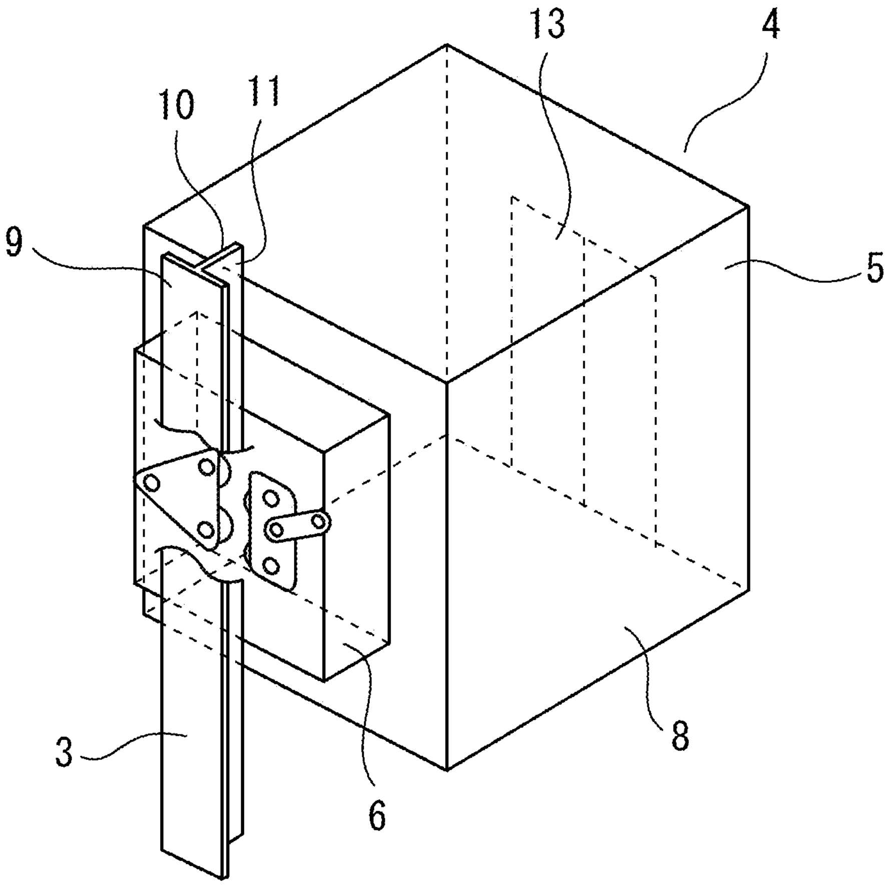
FIG. 2 is a perspective view for explaining a rail and a car of the elevator system to which the drive device for a self-propelled elevator according to the first embodiment is applied.

FIG. 2 is a perspective view for explaining the rail and the car of the elevator system to which the drive device for a self-propelled elevator according to the first embodiment is applied.

In this example, a shape of a horizontal cross section of the rail 3 is a T-shape. The rail 3 has a bottom panel 9 and a guide plate 10. The bottom panel 9 is a portion on a side far from the car 4. In this example, the guide plate 10 is a plate which is perpendicular to the bottom panel 9. The guide plate 10 is a plate-like portion which is positioned from the bottom panel 9 toward a side of the car 4. The guide plate 10 has a guide surface 11. The guide surface 11 is at least one of a front surface and a back surface of the guide plate 10. The guide surface 11 extends in the longitudinal direction of the rail 3. While the rail 3 actually extends from top to bottom, in FIG. 2, illustration of the rail 3 is omitted in an area sandwiched by break lines (wavy lines) in order to explain a positional relationship among a drive wheel 21, a first wheel-load equalizing link 22, and a second wheel-load equalizing link 23 to be described later, and the rail 3 and the drive device 6 in an easy-to-understand manner.

Although not illustrated, the divided rail 3*a* and the like also have a similar configuration to the rail 3.

The cab 5 has a car door 13. The car door 13 is provided on an opposite side to the drive device 6 in the cab 5. Although not illustrated, the car 4 may have a brake, a safety gear device, and the like in addition to the drive device 6. The brake is provided so that a braking force can be applied to the car 4 when the car 4 is moving or standing still. The safety gear device is provided so that the car 4 can be brought to a standstill by force when the car 4 is in free fall.

Next, the drive device 6 will be described with reference to FIG. 3 to FIG. 6.

Figure 3:
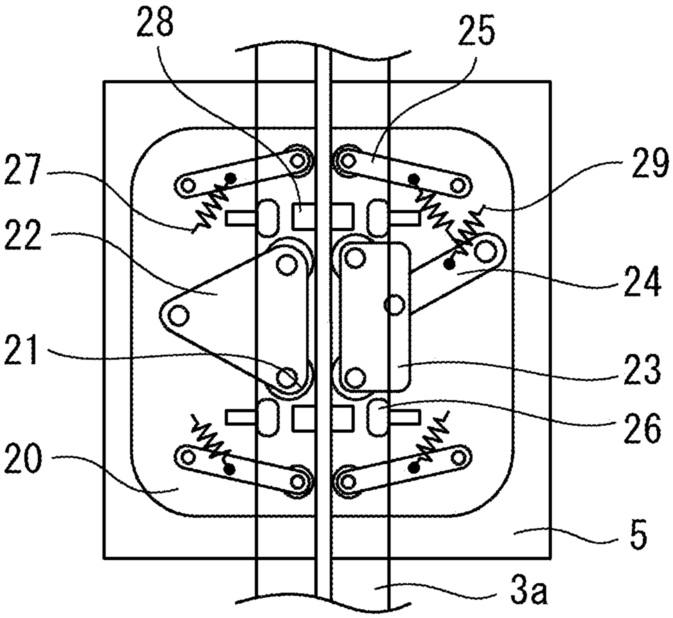
FIG. 3 is a rear view of the drive device for a self-propelled elevator according to the first embodiment.
Figure 4:
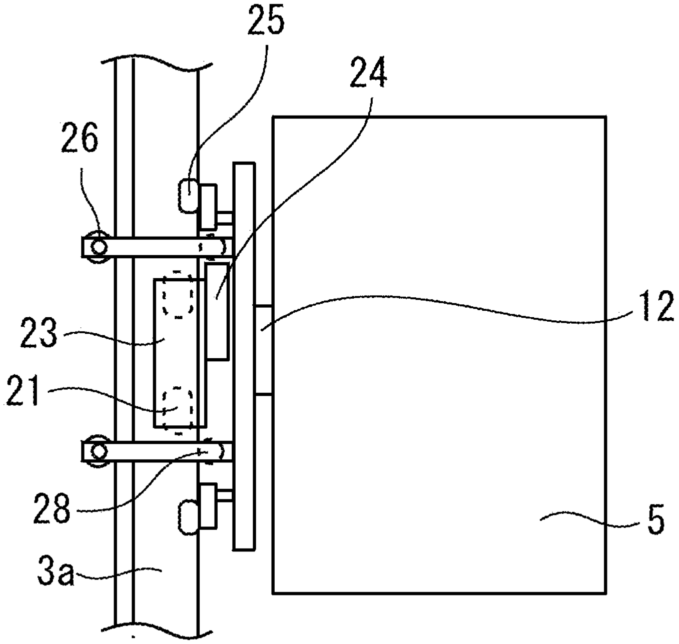
FIG. 4 is a side view of the drive device for a self-propelled elevator according to the first embodiment.
Figure 5:
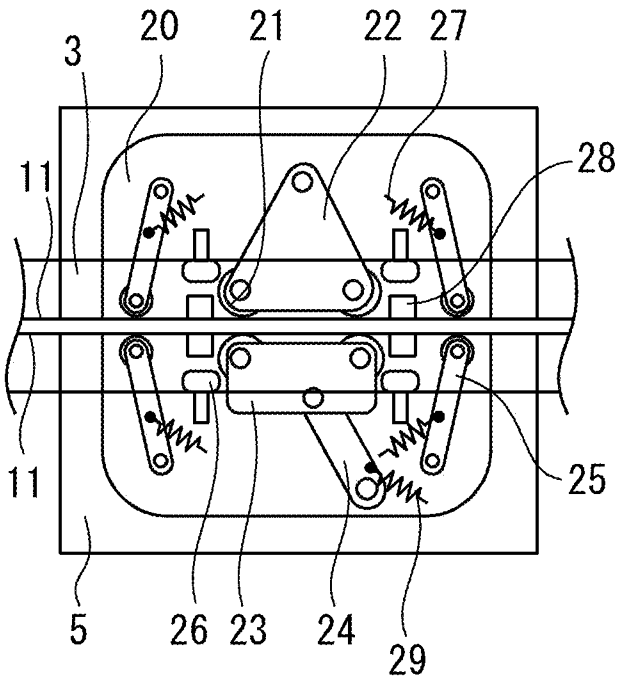
FIG. 5 is a rear view of the drive device for a self-propelled elevator according to the first embodiment.
Figure 6:
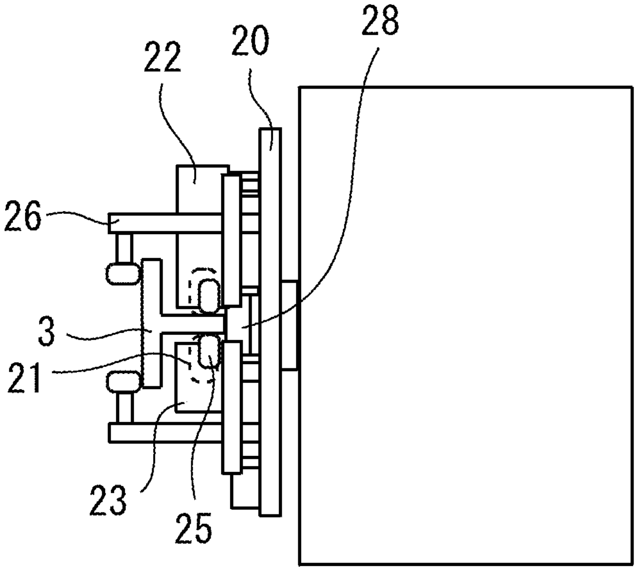
FIG. 6 is a side view of the drive device for a self-propelled elevator according to the first embodiment.

FIG. 3 is a rear view of the drive device for a self-propelled elevator according to the first embodiment. FIG. 4 is a side view of the drive device for a self-propelled elevator according to the first embodiment. FIG. 5 is a rear view of the drive device for a self-propelled elevator according to the first embodiment. FIG. 6 is a side view of the drive device for a self-propelled elevator according to the first embodiment.

FIG. 3 and FIG. 4 show a case where the car 4 moves in the vertical direction.

A bearing 12 couples a back face of the cab 5 and the drive device 6 to each other. When the divided rail 3*a* or the like rotates, the drive device 6 rotates together with the divided rail 3*a* or the like. In contrast, the cab 5 stands still and does not rotate. As a result, the articles to be carried do not rotate inside the cab 5.

The drive device 6 has a rotating plate 20 as a rotating body.

The rotating plate 20 is rotatably coupled to the back face of the cab 5 via the bearing 12.

The drive device 6 has a pair of wheels and a pair of drive wheels 21.

One of the pair of wheels is in contact with one of a pair of guide surfaces 11. One of the pair of drive wheels 21 is in contact with the one of the pair of guide surfaces 11 below the one of the pair of wheels. The other of the pair of wheels is in contact with the other of the pair of guide surfaces 11. The other of the pair of drive wheels 21 is in contact with the other of the pair of guide surfaces 11 below the other of the pair of wheels.

The one wheel and the other wheel of the pair of wheels are arranged at symmetrical positions with respect to both guide surfaces 11. The one drive wheel 21 and the other drive wheel 21 of the pair of drive wheels 21 are arranged at symmetrical positions with respect to both guide surfaces 11.

Although not illustrated, the drive device 6 has at least one motor for moving the drive wheels 21.

In this example, the first wheel-load equalizing link 22 has a triangular shape. The first wheel-load equalizing link 22 is positioned on a side of the one of the pair of guide surfaces 11 as a wheel support link. The first wheel-load equalizing link 22 rotatably supports the one of the pair of wheels and the one of the pair of drive wheels 21. In the first wheel-load equalizing link 22, one end on an opposite side to the rail 3 is rotatably supported by the rotating plate 20.

In this example, the second wheel-load equalizing link 23 has a square shape. The second wheel-load equalizing link 23 is positioned on a side of the other of the pair of guide surfaces 11. The second wheel-load equalizing link 23 rotatably supports the other of the pair of wheels and the other of the pair of drive wheels 21 as a wheel support link. In the second wheel-load equalizing link 23, an opposite side to the rail 3 is rotatably supported by a self-servo link 24.

The self-servo link 24 is positioned diagonally at an angle of 45 degrees or less with respect to the horizontal direction. One end of the self-servo link 24 is rotatably coupled to the second wheel-load equalizing link 23 on an opposite side to the rail 3. The other end of the self-servo link 24 is rotatably supported by the rotating plate 20.

One end of a spring 29 is coupled to the second wheel-load equalizing link 23 or the self-servo link 24. The other end of the spring 29 is coupled to the rotating plate 20.

One of a first pair of first left-right inclination prevention rollers 25 comes into contact with the one of the pair of guide surfaces 11 above the one of the pair of wheels and the one of the pair of drive wheels 21. The other of the first pair of first left-right inclination prevention rollers 25 comes into contact with the one of the pair of guide surfaces 11 below the one of the pair of wheels and the one of the pair of drive wheels 21.

One of a second pair of first left-right inclination prevention rollers 25 comes into contact with the other of the pair of guide surfaces 11 above the other of the pair of wheels and the other of the pair of drive wheels 21. The other of the second pair of first left-right inclination prevention rollers 25 comes into contact with the other of the pair of guide surfaces 11 below the other of the pair of wheels and the other of the pair of drive wheels 21.

In one of a first pair of links, one end rotatably supports the one of the first pair of first left-right inclination prevention rollers 25. In the one of the first pair of links, the other end is rotatably supported by the rotating plate 20. In the other of the first pair of links, one end rotatably supports the other of the first pair of first left-right inclination prevention rollers 25. In the other of the first pair of links, the other end is rotatably supported by the rotating plate 20.

In one of a second pair of links, one end rotatably supports the one of the second pair of first left-right inclination prevention rollers 25. In the one of the second pair of links, the other end is rotatably supported by the rotating plate 20. In the other of the second pair of links, one end rotatably supports the other of the second pair of first left-right inclination prevention rollers 25. In the other of the second pair of links, the other end is rotatably supported by the rotating plate 20.

A plurality of springs 27 function as an elastic body which imparts a restoring force when the cab 5 and the rotating plate 20 start to incline to the left or right.

In one of a first pair of springs 27, one end is coupled to a center part of the one of the first pair of links. In the one of the first pair of springs 27, the other end is coupled to the rotating plate 20. In the other of the first pair of springs 27, one end is coupled to a center part of the other of the first pair of links. In the other of the first pair of springs 27, the other end is coupled to the rotating plate 20.

In one of a second pair of springs 27, one end is coupled to a center part of the one of the second pair of links. In the one of the second pair of springs 27, the other end is coupled to the rotating plate 20. In the other of the second pair of springs 27, one end is coupled to a center part of the other of the second pair of links. In the other of the second pair of springs 27, the other end is coupled to the rotating plate 20.

One of a first pair of first fore-aft inclination prevention rollers 26 is positioned above the first wheel-load equalizing link 22 in a height direction on a side of the one of the pair of guide surfaces 11. The one of the first pair of first fore-aft inclination prevention rollers 26 is supported by the rotating plate 20 via an arm in a state of being in contact with a side far from the cab 5 on the bottom panel 9 of the rail 3. The other of the first pair of first fore-aft inclination prevention rollers 26 is positioned below the first wheel-load equalizing link 22 in a height direction on a side of the one of the pair of guide surfaces 11. The other of the first pair of first fore-aft inclination prevention rollers 26 is supported by the rotating plate 20 via an arm in a state of being in contact with a side near to the cab 5 on the bottom panel 9 of the rail 3.

One of a second pair of first fore-aft inclination prevention rollers 26 is positioned above the second wheel-load equalizing link 23 in a height direction on a side of the other of the pair of guide surfaces 11. The one of the second pair of first fore-aft inclination prevention rollers 26 is supported by the rotating plate 20 via an arm in a state of being in contact with the side far from the cab 5 on the bottom panel 9 of the rail 3. The other of the second pair of first fore-aft inclination prevention rollers 26 is positioned below the second wheel-load equalizing link 23 in a height direction on a side of the other of the pair of guide surfaces 11. The other of the second pair of first fore-aft inclination prevention rollers 26 is supported by the rotating plate 20 via an arm in a state of being in contact with the side near to the cab 5 on the bottom panel 9 of the rail 3.

One of a pair of second fore-aft inclination prevention rollers 28 is positioned between the one of the first pair of first fore-aft inclination prevention rollers 26 and the one of the second pair of first fore-aft inclination prevention rollers 26 in the height direction. The one of the pair of second fore-aft inclination prevention rollers 28 is supported by the rotating plate 20 in a state of being in contact with a tip of the guide plate 10 of the rail 3. The other of the pair of second fore-aft inclination prevention rollers 28 is positioned between the other of the first pair of first fore-aft inclination prevention rollers 26 and the other of the second pair of first fore-aft inclination prevention rollers 26 in the height direction. The other of the pair of second fore-aft inclination prevention rollers 28 is supported by the rotating plate 20 in a state of being in contact with the tip of the guide plate 10 of the rail 3.

FIG. 5 and FIG. 6 show a case where the car 4 moves in the horizontal direction.

As shown in FIG. 5 and FIG. 6, the drive device 6 rotates 90 degrees so that the first wheel-load equalizing link 22 comes into being positioned above the rail 3 from the state shown in FIG. 3 and FIG. 4.

In doing so, below the rail 3, the other of the pair of wheels and the other of the pair of drive wheels 21 may not come into contact with the guide surfaces 11 depending on a strength of the spring 29. Above the rail 3, the one of the pair of wheels and the one of the pair of drive wheels 21 come into contact with the guide surfaces 11.

The one of the pair of wheels and the one of the pair of drive wheels 21 come into contact with the guide surfaces 11. The one of the pair of wheels and the one of the pair of drive wheels 21 support dead loads of the car 4 and the drive device 6. The dead loads act as a wheel load to the rail 3. The wheel load generates a friction force when moving the cab 5 in the horizontal direction. The one of the pair of wheels and the one of the pair of drive wheels 21 generate a force which moves the cab 5 in the horizontal direction.

When the car 4 arrives at the divided rail 3*a* or the like, the car 4 is fixed so as not to rotate. For example, the cab 5 is fixed to the divided rail 3*a* or the like by a brake (not illustrated). For example, the cab 5 is fixed to the hoistway 2 by a pin or the like (not illustrated).

In this state, the divided rail 3*a* and the like rotate so that the longitudinal direction changes from the vertical direction to the horizontal direction. The drive device 6 and the rotating plate 20 rotate so as to trail the rotation of the divided rail 3*a*. As a result, the wheel load by the self-servo link 24 decreases. Finally, the wheel load becomes zero.

When the divided rail 3*a* or the like rotates so that the longitudinal direction of the divided rail 3*a* or the like changes from the horizontal direction to the vertical direction, the second wheel-load equalizing link 23 and the self-servo link 24 return to their regular positions due to a restoring force of the spring 29.

According to the first embodiment described above, the pair of wheels and the pair of the drive wheels 21 are positioned so as to sandwich the guide surfaces 11 of the rail 3. When the longitudinal direction of the divided rail 3*a* or the like is the vertical direction, the pair of wheels and the pair of the drive wheels 21 generate a force that moves the cab 5 in the vertical direction by friction with the divided rail 3*a* or the like. When the longitudinal direction of the divided rail 3*a* or the like is the horizontal direction, the pair of wheels and the pair of the drive wheels 21 generate a force that moves the cab 5 in the horizontal direction by friction with the divided rail 3*a* or the like. Therefore, the cab 5 can be moved in the vertical direction and the horizontal direction with one drive device 6. As a result, the drive device 6 can be simplified and lightened. In addition, vibration and noise during a movement of the cab 5 can be suppressed.

In addition, when the longitudinal direction of the divided rail 3*a* or the like is the horizontal direction, the other of the pair of wheels and the other of the pair of drive wheels 21 may not come into contact with the guide surfaces 11 depending on a strength of the spring 29. Above the rail 3, the one of the pair of wheels and the one of the pair of drive wheels 21 come into contact with the guide surfaces 11. The one of the pair of wheels and the one of the pair of drive wheels 21 generate a force which moves the cab 5 in the horizontal direction. Therefore, energy consumption can be suppressed by only driving wheels where a wheel load is generated.

In addition, the self-servo link 24 is positioned diagonally at an angle of 45 degrees or less with respect to the horizontal direction. Therefore, using dead loads of the car 4 and the drive device 6, the wheel load equal to or greater than the dead loads can be obtained.

Furthermore, when the cab 5 moves in the vertical direction, with an increase in a load weight due to the self-servo link 24, the wheel load of the wheels and the drive wheels 21 passively increases. In addition, when the cab 5 moves in the horizontal direction, the wheels and the drive wheels 21 support the cab 5 on an upper side of the guide surfaces 11 of the rail 3. As a result, with an increase in the load weight, the wheel load of the wheels and the drive wheels 21 passively increases. In doing so, a wheel load necessary at the time of a maximum load weight need not be constantly continuously generated. Therefore, the rail 3, the wheels, and the drive wheels 21 need not be worn down in a wasteful manner. And a hydraulic actuator or the like which measures a load weight and actively generates a wheel load in accordance with the load weight need not be used. As a result, the drive device 6 can be simplified and lightened.

In addition, the drive device 6 has the plurality of first left-right inclination prevention rollers 25, the plurality of first fore-aft inclination prevention rollers 26, and the plurality of second fore-aft inclination prevention rollers 28. Therefore, even when a biased load is applied inside the cab 5 when the cab 5 moves in the vertical direction or the horizontal direction, an inclination of the cab 5 can be suppressed.

In addition, the first wheel-load equalizing link 22 is rotatably supported by the rotating plate 20. Therefore, a wheel load which acts on the one of the pair of wheels and the one of the pair of drive wheels 21 can be averaged.

Furthermore, the second wheel-load equalizing link 23 is rotatably supported by the rotating plate 20. Therefore, a wheel load which acts on the other of the pair of wheels and the other of the pair of drive wheels 21 can be averaged.

When the car 4 passes a step difference or a clearance generated in a joint portion of the rail 3, between the divided rail 3*a* or the like and the rail 3, and the like, the first wheel-load equalizing link 22 and the second wheel-load equalizing link 23 slightly rotate with respect to the rotating plate 20. Therefore, the wheels and the drive wheels 21 can readily pass the step difference or the clearance.

Note that the rail 3 may be divided in a middle part of the hoistway 2 to enable the car 4 to move in the horizontal direction.

Note that a combination of the wheels and the drive wheels 21 may be changed as appropriate. For example, when there are three wheels and one drive wheel 21, in FIG. 3, the drive wheel 21 may be positioned on an upper side or a lower side on the side of the one of the pair of guide surfaces 11. For example, when there are two wheels and two drive wheels 21, in FIG. 3, the two drive wheels 21 may be positioned on the side of the one of the pair of guide surfaces 11 or one drive wheel may be respectively positioned on a lower side on the side of the one of the pair of guide surfaces 11 and a lower side on the side of the other of the pair of guide surfaces 11. For example, when there are four drive wheels 21, in FIG. 3, the drive wheels 21 may be arranged at all positions.

Next, a first modification will be described with reference to FIG. 7 and FIG. 8.

Figure 7:
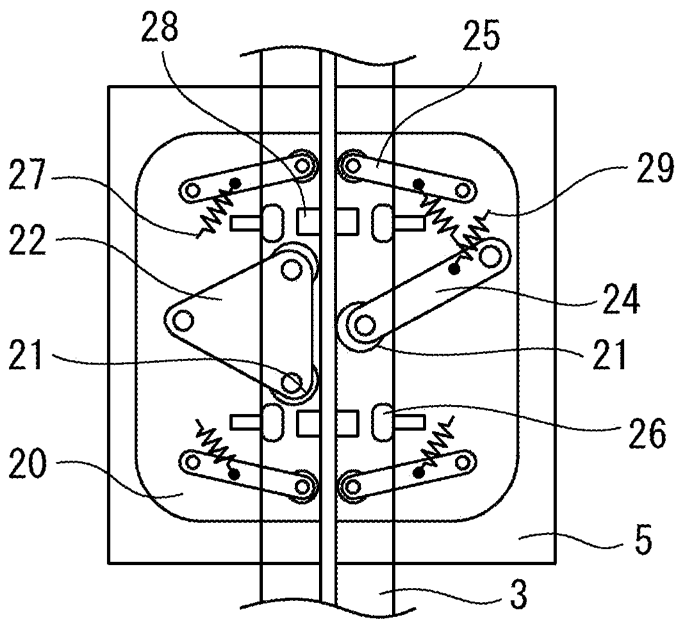
FIG. 7 is a rear view of a first modification of the drive device for a self-propelled elevator according to the first embodiment.

FIG. 7 is a rear view of a first modification of the drive device for a self-propelled elevator according to the first embodiment. FIG. 8 is a side view of the first modification of the drive device for a self-propelled elevator according to the first embodiment.

Figure 8:
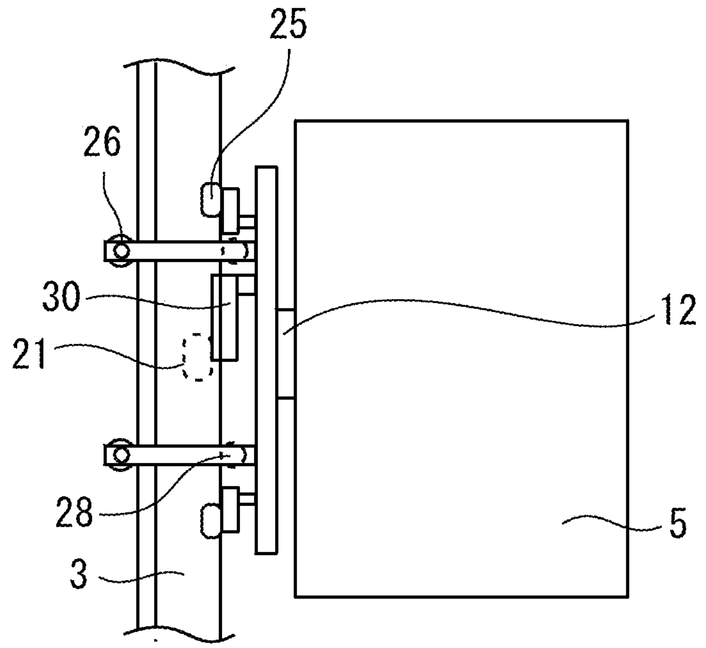
FIG. 8 is a side view of the first modification of the drive device for a self-propelled elevator according to the first embodiment.

As shown in FIG. 7 and FIG. 8, in the first modification, the second wheel-load equalizing link 23 is not present. At least one of the wheels and the drive wheels 21 are directly rotatably supported by an end part of the self-servo link 24 on the side of the rail 3.

According to the first modification described above, the second wheel-load equalizing link 23 is not present. Therefore, the drive device 6 can be further simplified by a smaller number of parts. As a result, cost of the drive device 6 can be suppressed and the drive device 6 can be further lightened.

Next, a second modification will be described with reference to FIG. 9.

Figure 9:
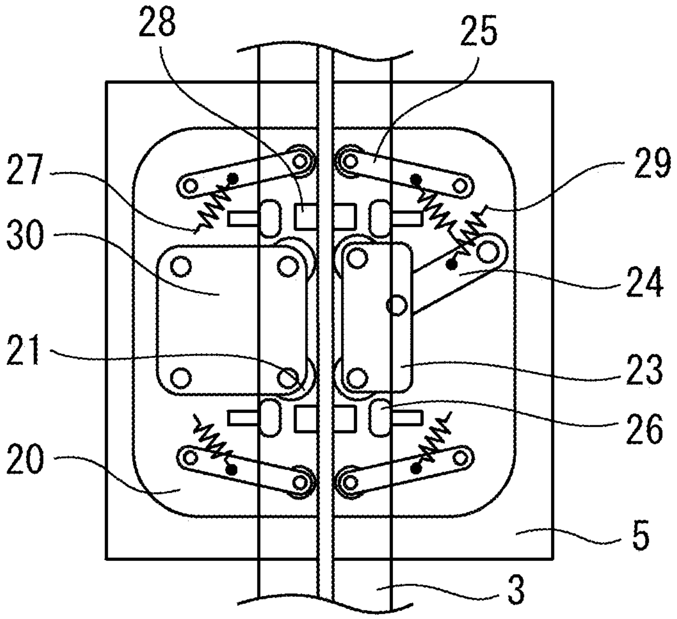
FIG. 9 is a rear view of a second modification of the drive device for a self-propelled elevator according to the first embodiment.

FIG. 9 is a rear view of a second modification of the drive device for a self-propelled elevator according to the first embodiment.

As shown in FIG. 9, in the second modification, the first wheel-load equalizing link 22 is not present. The wheels and the drive wheels 21 are supported by a stationary link 30. The stationary link 30 does not rotate with respect to the rotating plate 20.

According to the second modification described above, the wheels and the drive wheels 21 are supported by the stationary link 30. Therefore, the drive device 6 can be further simplified. As a result, the cost of the drive device 6 can be suppressed and the drive device 6 can be made even lighter.

Next, a third modification will be described with reference to FIG. 10.

Figure 10:
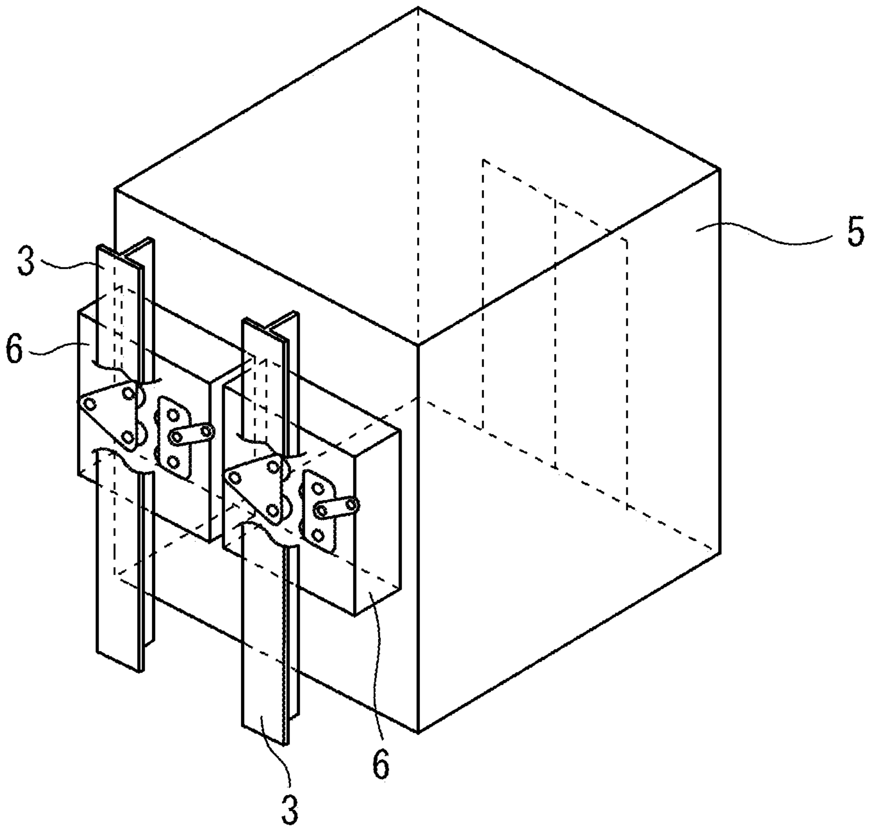
FIG. 10 is a perspective view of a third modification of the drive device for a self-propelled elevator according to the first embodiment.

FIG. 10 is a perspective view of a third modification of the drive device for a self-propelled elevator according to the first embodiment.

As shown in FIG. 10, the car 4 has a pair of drive devices 6. One of the pair of drive devices 6 is guided by the one of the pair of rails 3. The other of the pair of drive devices 6 is guided by the other of the pair of rails 3.

According to the third modification described above, the one of the pair of drive devices 6 is guided by the one of the pair of rails 3. The other of the pair of drive devices 6 is guided by the other of the pair of rails 3. Therefore, each of the rails 3 and each of the drive devices 6 can be made smaller. As a result, an area of the hoistway 2 on a horizontal projection plane can be reduced.

Second Embodiment

Figure 11:
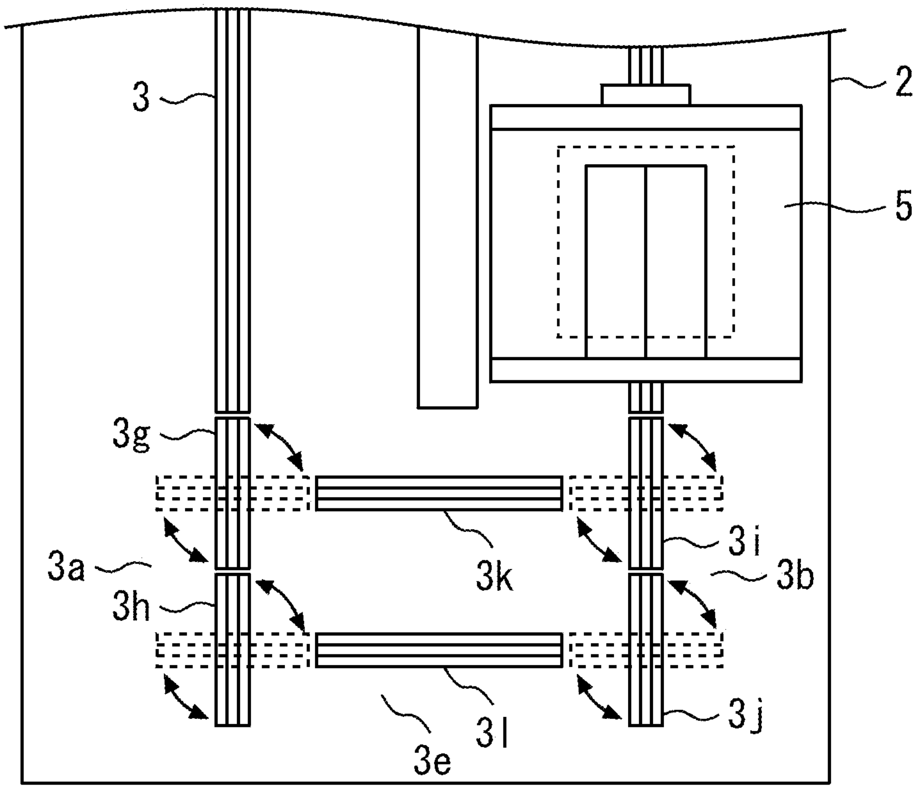
FIG. 11 is a diagram showing a lower portion of an elevator system to which a drive device for a self-propelled elevator according to a second embodiment is applied.
Figure 12:
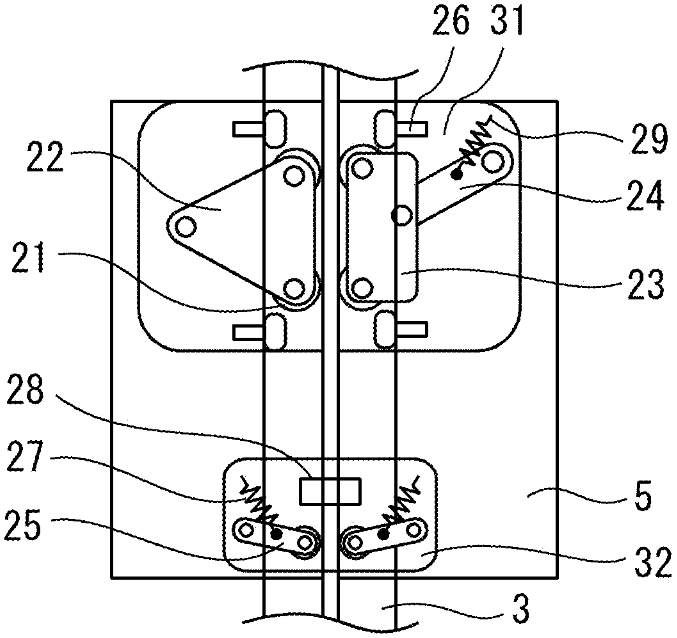
FIG. 12 is a rear view of the drive device for a self-propelled elevator according to the second embodiment.
Figure 13:
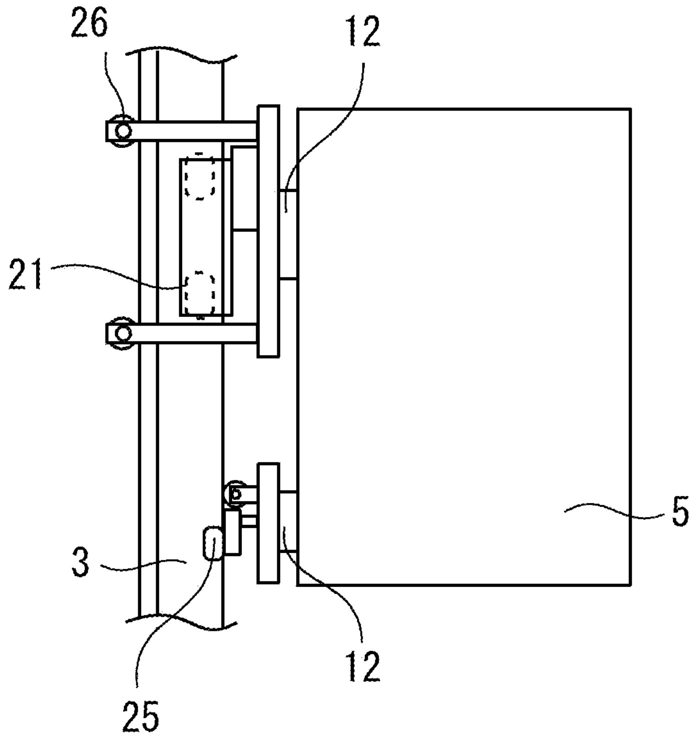
FIG. 13 is a side view of the drive device for a self-propelled elevator according to the second embodiment.
Figure 14:
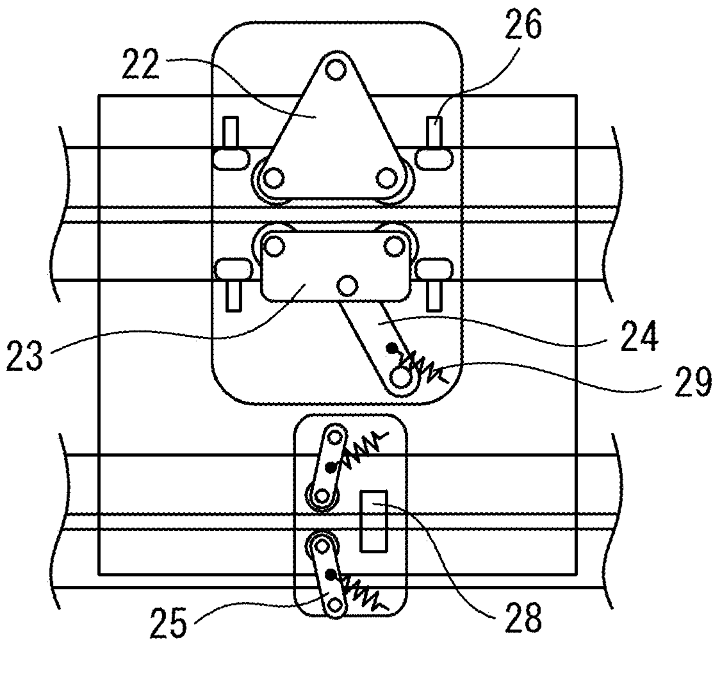
FIG. 14 is a rear view of the drive device for a self-propelled elevator according to the second embodiment.
Figure 15:
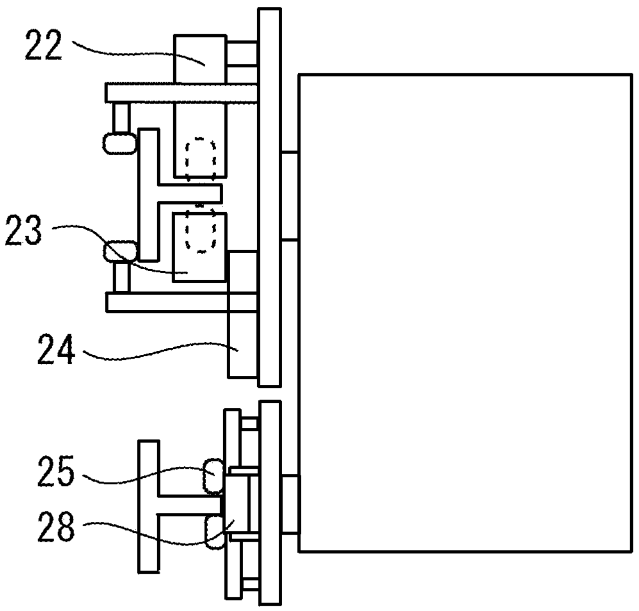
FIG. 15 is a side view of the drive device for a self-propelled elevator according to the second embodiment.

FIG. 11 is a diagram showing a lower portion of an elevator system to which a drive device for a self-propelled elevator according to a second embodiment is applied. FIG. 12 is a rear view of the drive device for a self-propelled elevator according to the second embodiment. FIG. 13 is a side view of the drive device for a self-propelled elevator according to the second embodiment. FIG. 14 is a rear view of the drive device for a self-propelled elevator according to the second embodiment. FIG. 15 is a side view of the drive device for a self-propelled elevator according to the second embodiment. Portions that are the same or equivalent to portions of the first embodiment will be denoted by same reference signs. Descriptions of such portions will be omitted.

As shown in FIG. 11, the divided rail 3*a* is vertically divided into an upper divided rail 3*g* and a lower divided rail 3*h*. The upper divided rail 3*g* and the lower divided rail 3*h* are respectively provided so as to be rotatable by an actuator (not illustrated). The upper divided rail 3*g* and the lower divided rail 3*h* are provided so as to be capable of maintaining their attitudes when a longitudinal direction of the upper divided rail 3*g* and the lower divided rail 3*h* is the vertical direction or the horizontal direction. The upper divided rail 3*g* and the lower divided rail 3*h* are provided so as to be smoothly connectable to each other when the longitudinal direction of the upper divided rail 3*g* and the lower divided rail 3*h* is the vertical direction.

The divided rail 3*d* is vertically divided into an upper divided rail 3*i* and a lower divided rail 3*j*. The upper divided rail 3*i* and the lower divided rail 3*j* are respectively provided so as to be rotatable by an actuator (not illustrated). The upper divided rail 3*i* and the lower divided rail 3*j* are provided so as to be capable of maintaining their attitudes when a longitudinal direction of the upper divided rail 3*i* and the lower divided rail 3*j* is the vertical direction or the horizontal direction. The upper divided rail and the lower divided rail are provided so as to be smoothly connectable to each other when the longitudinal direction of the upper divided rail and the lower divided rail is the vertical direction.

The horizontal rail 3*e* is vertically divided into an upper horizontal rail 3*k* and a lower horizontal rail 3*l*. The upper horizontal rail 3*k* and the lower horizontal rail 3*l* are respectively positioned with a longitudinal direction of the upper horizontal rail 3*k* and the lower horizontal rail 3*l* being the horizontal direction.

One side of the upper horizontal rail 3*k* is provided so as to be smoothly connectable to the upper divided rail 3*g* when the longitudinal direction of the upper divided rail 3*g* is the horizontal direction. The other side of the upper horizontal rail 3*k* is provided so as to be smoothly connectable to the upper divided rail 3*i* when the longitudinal direction of the upper divided rail 3*i* is the horizontal direction.

One side of the lower horizontal rail 3*l* is provided so as to be smoothly connectable to the lower divided rail 3*h* when the longitudinal direction of the lower divided rail 3*h* is the horizontal direction. The other side of the lower horizontal rail 3*l* is provided so as to be smoothly connectable to the lower divided rail 3*j* when the longitudinal direction of the lower divided rail 3*j* is the horizontal direction.

As shown in FIG. 12 and the like, the drive device 6 has a second rotating plate 31 and a third rotating plate 32 as a plurality of divided bodies. The second rotating plate 31 is positioned on an upper side of the drive device 6. The third rotating plate 32 is positioned on a lower side of the drive device 6. The second rotating plate 31 and the third rotating plate 32 are respectively rotatably coupled to the back face of the cab 5 via the bearings 12.

The second rotating plate 31 has the first wheel-load equalizing link 22, the second wheel-load equalizing link 23, the self-servo link 24, four wheels and drive wheels 21 including at least one drive wheel, the first fore-aft inclination prevention roller 26, and at least one motor.

The third rotating plate 32 has the first left-right inclination prevention roller 25 and the second fore-aft inclination prevention roller 28.

The cab 5 is guided by one rail when moving in the vertical direction. The cab 5 is guided by two rails when moving in the horizontal direction. Specifically, one rail is necessary for each of the second rotating plate 31 and the third rotating plate 32.

For example, when the cab 5 moves from a lower part of the hoistway 2*a* to the hoistway 2*b* in FIG. 11, on a side of the second rotating plate 31, the wheels and the drive wheels 21 move along the upper divided rail 3*g*, the upper horizontal rail 3*k*, and the upper divided rail 3*i*. On the other hand, on a side of the third rotating plate 32, the first left-right inclination prevention roller 25 and the second fore-aft inclination prevention roller 28 move on the lower divided rail 3*h*, the lower horizontal rail 3*l*, and the lower divided rail 3*j*.

Specifically, when the cab 5 reaches the upper divided rail 3*g* and the lower divided rail 3*h*, the cab 5 is fixed so as not to rotate. For example, the cab 5 is fixed to at least one of the upper divided rail 3*g* and the lower divided rail 3*h* by a brake (not illustrated). For example, the cab 5 is fixed to the hoistway 2 by a pin or the like (not illustrated).

In this state, the upper divided rail 3*g* and the lower divided rail 3*h* rotate so that the longitudinal direction changes from the vertical direction to the horizontal direction. The second rotating plate 31 rotates so as to trail the rotation of the upper divided rail 3*g*. As a result, the wheel load by the self-servo link 24 decreases. Finally, the wheel load becomes zero. On the other hand, the third rotating plate 32 rotates so as to trail the rotation of the lower divided rail 3*h*.

In this state, the cab 5 moves in the horizontal direction. Subsequently, when the cab 5 reaches the upper divided rail 3*i* and the lower divided rail 3*j*, the cab 5 is fixed so as not to rotate. For example, the cab 5 is fixed to at least one of the upper divided rail 3*i* and the lower divided rail 3*j* by a brake (not illustrated). For example, the cab 5 is fixed to the hoistway 2 by a pin or the like (not illustrated).

In this state, the upper divided rail 3*i* and the lower divided rail 3*j* rotate so that the longitudinal direction changes from the horizontal direction to the vertical direction. In doing so, the second wheel-load equalizing link 23 and the self-servo link 24 return to their regular positions due to a restoring force of the spring 29.

According to the second embodiment described above, the second rotating plate 31 is positioned on the upper side of the drive device 6. The third rotating plate 32 is positioned on the lower side of the drive device 6. Therefore, when the cab 5 moves in the vertical direction or the horizontal direction, the cab 5 can be prevented from falling in the fore-aft direction and the horizontal direction.

In addition, radius of rotation and masses of the second rotating plate 31 and the third rotating plate 32 decrease. Due to the decrease in the radius of rotation and the masses, inertial masses during rotation of the second rotating plate 31 and the third rotating plate 32 also decrease. Therefore, actuators positioned in the hoistway 2 in order to rotate the second rotating plate 31 and the third rotating plate 32 can be made smaller. As a result, an area of the hoistway 2 on a horizontal projection plane can be reduced.

In addition, the drive device 6 has the plurality of first left-right inclination prevention rollers 25, the plurality of first fore-aft inclination prevention rollers 26, and the plurality of second fore-aft inclination prevention rollers 28. Therefore, even when a biased load is applied inside the cab 5 when the cab 5 moves in the vertical direction or the horizontal direction, an inclination of the cab 5 can be suppressed.

Third Embodiment

Figure 16:
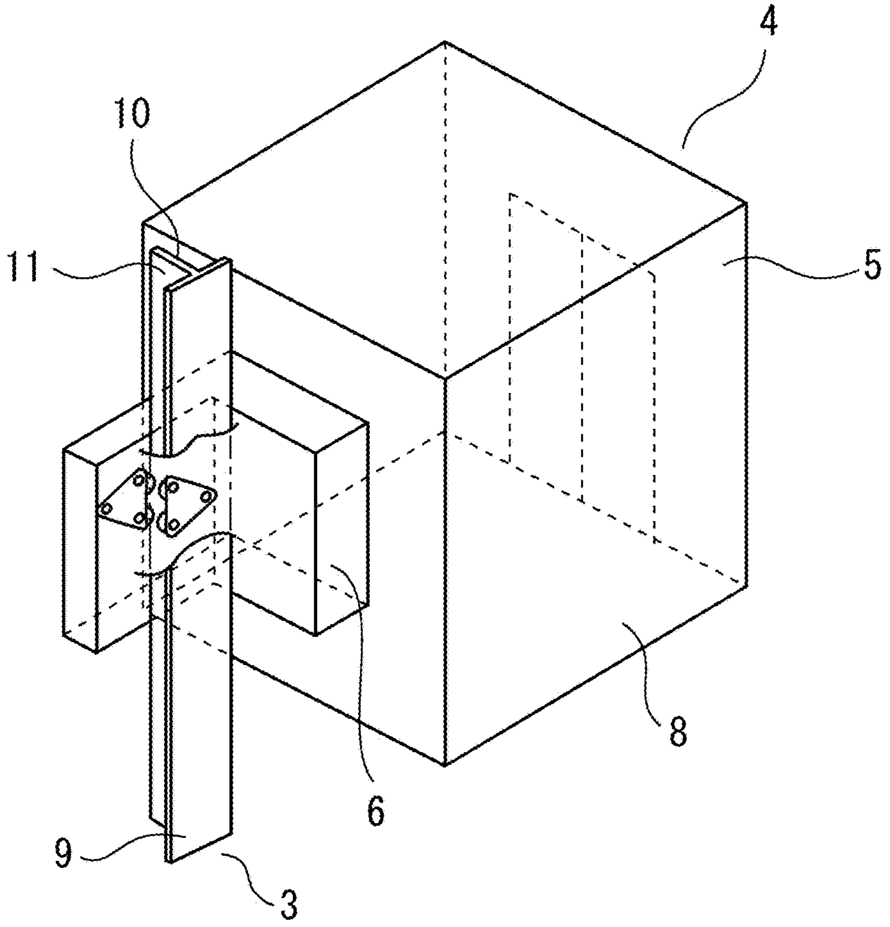
FIG. 16 is a perspective view of a drive device for a self-propelled elevator according to a third embodiment.

FIG. 16 is a perspective view of a drive device for a self-propelled elevator according to a third embodiment. Portions that are the same or equivalent to portions of the first embodiment will be denoted by same reference signs. Descriptions of such portions will be omitted.

As shown in FIG. 16, in the third embodiment, the rail 3 is positioned as though the rail 3 according to the first embodiment is rotated 90 degrees on a horizontal projection plane. In this case, the guide plate 10 becomes parallel to an open and close direction of the car door 13.

Next, the drive device 6 will be described with reference to FIG. 17 to FIG. 20.

Figure 17:
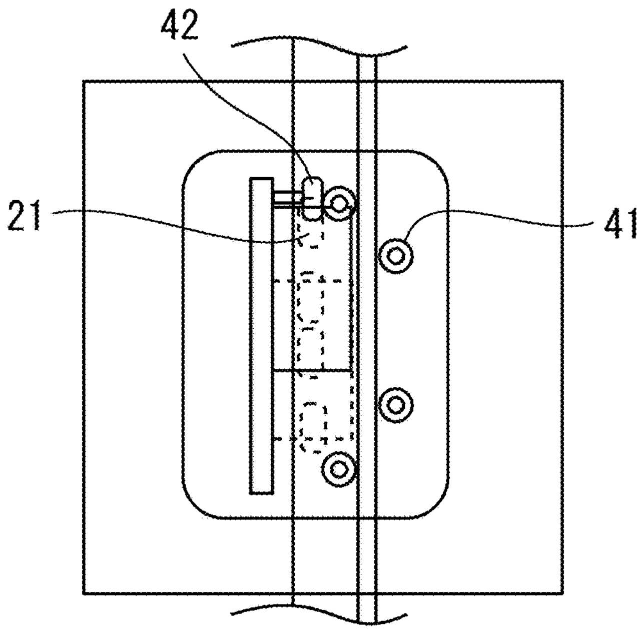
FIG. 17 is a rear view of the drive device for a self-propelled elevator according to the third embodiment.
Figure 18:
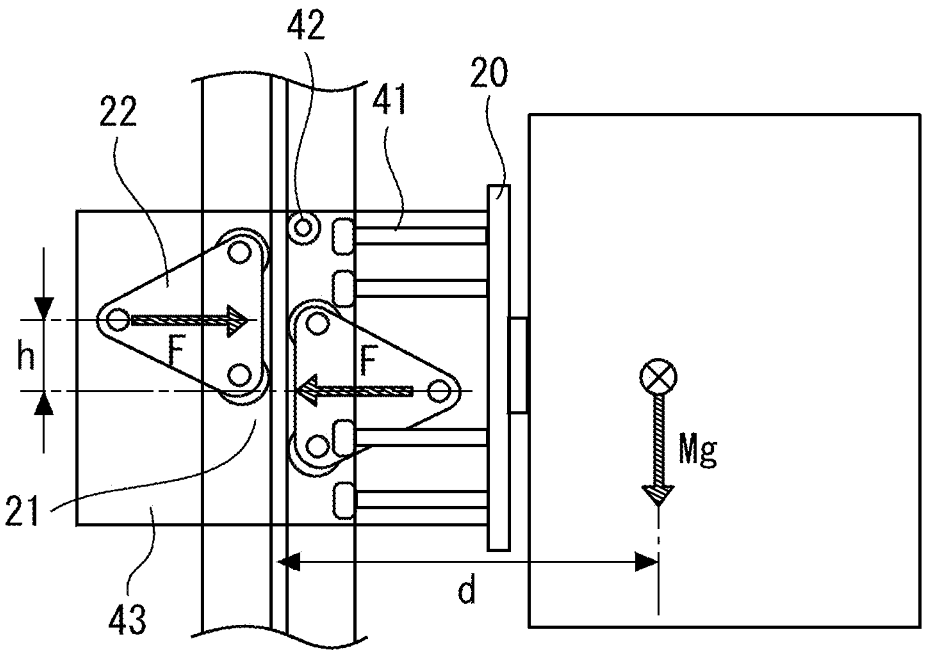
FIG. 18 is a side view of the drive device for a self-propelled elevator according to the third embodiment.
Figure 19:
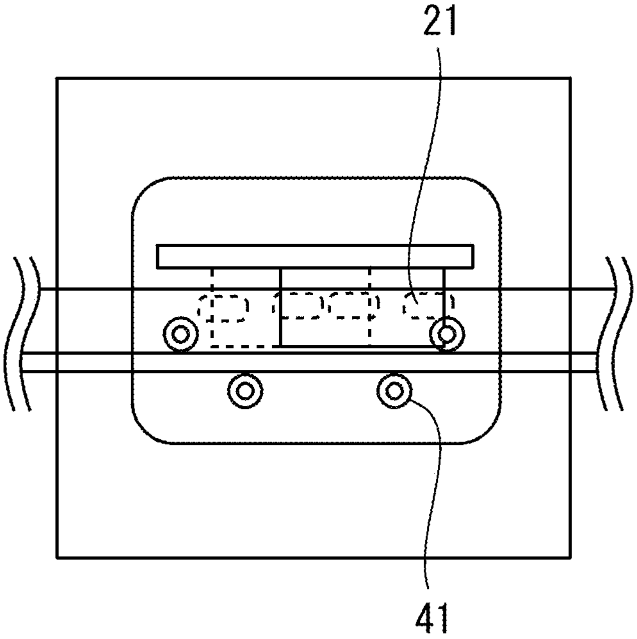
FIG. 19 is a rear view of the drive device for a self-propelled elevator according to the third embodiment.
Figure 20:
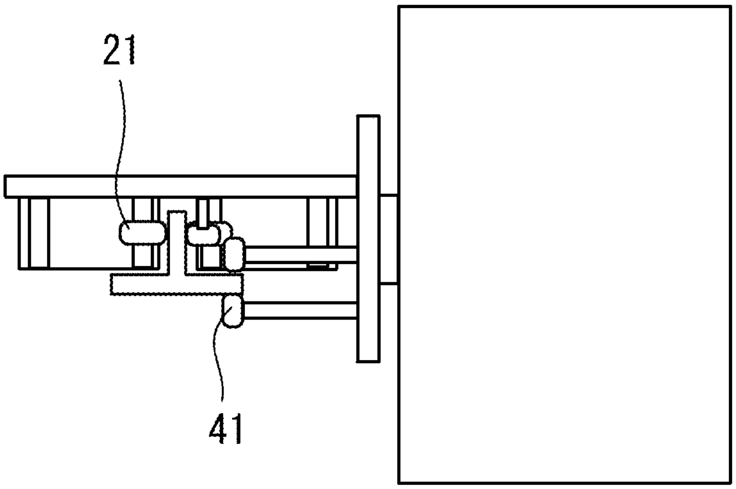
FIG. 20 is a side view of the drive device for a self-propelled elevator according to the third embodiment.

FIG. 17 is a rear view of the drive device for a self-propelled elevator according to the third embodiment. FIG. 18 is a side view of the drive device for a self-propelled elevator according to the third embodiment. FIG. 19 is a rear view of the drive device for a self-propelled elevator according to the third embodiment. FIG. 20 is a side view of the drive device for a self-propelled elevator according to the third embodiment.

In this example, the drive device 6 has a support plate 43 and a pair of first wheel-load equalizing links 22.

The support plate 43 is fixed to the rotating plate 20 so as to be perpendicular to the rotating plate 20 as a backing body.

One of the pair of first wheel-load equalizing links 22 is positioned on a side of the one of the pair of guide surfaces 11 on a side far from the cab 5. The one of the pair of first wheel-load equalizing links 22 rotatably supports the one of the pair of wheels and the one of the pair of drive wheels 21 as a first wheel support link. In the one of the pair of first wheel-load equalizing links 22, one end on an opposite side to the rail 3 is rotatably supported by the support plate 43.

The other of the pair of first wheel-load equalizing links 22 is positioned on a side of the other of the pair of guide surfaces 11 on a side near to the cab 5. The other of the pair of first wheel-load equalizing links 22 is arranged at a position lower by h than the one of the pair of first wheel-load equalizing links 22 as a second wheel support link. The other of the pair of first wheel-load equalizing links 22 rotatably supports the other of the pair of wheels and the other of the pair of drive wheels 21. In the other of the pair of first wheel-load equalizing links 22, one end on an opposite side to the rail 3 is rotatably supported by the support plate 43.

A first set of a plurality of second left-right inclination prevention rollers 41 is provided on the rotating plate 20. The first set of a plurality of second left-right inclination prevention rollers 41 is in contact with one surface of the bottom panel 9 on a side of the cab in the rail 3.

A second set of a plurality of second left-right inclination prevention rollers 41 is provided on the support plate 43. The second set of a plurality of second left-right inclination prevention rollers 41 is in contact with the other surface of the bottom panel 9 on the side of the cab in the rail 3.

For example, a third fore-aft inclination prevention roller 42 is arranged at a position at a same height as the wheel or the drive wheel 21 in an uppermost portion on a side far from the cab 5. For example, the third fore-aft inclination prevention roller 42 is arranged at a position higher than the wheel or the drive wheel 21 in the uppermost portion on a side far from the cab 5. The third fore-aft inclination prevention roller 42 comes into contact with the guide surface 11 on a side near to the cab 5 in the rail 3.

According to the third embodiment described above, the other of the pair of first wheel-load equalizing links 22 is arranged at a position lower by h than the one of the pair of first wheel-load equalizing links 22 as the second wheel support link. Therefore, a moment which causes the cab 5 to fall can be used as a wheel load of the wheels and the drive wheels 21. As a result, a large wheel load necessary for moving the cab 5 in the vertical direction can be obtained by friction between the wheels and the drive wheels 21 and the rail 3.

Specifically, as shown in FIG. 18, when a center of gravity on which a total mass M of the cab 5 and the drive device 6 acts is separated from the rail 3 by a distance d and a wheel load of each of the wheels and the drive wheels 21 is denoted by F/2, due to a balance of moment, the following expression is satisfied, where g denotes gravitational acceleration.

$$F=Mg\times(d/h)$$

Therefore, by appropriately setting d/h, a wheel load equal to or greater than the dead loads of the cab 5 and the drive device 6 can be obtained. For example, when d/h is 1, a wheel load equal to the dead loads of the cab 5 and the drive device 6 can be obtained.

In addition, the wheel load is proportional to the total mass M of the cab 5 and the drive device 6. Therefore, when the load weight of the cab 5 increases, the wheel load of the wheels and the drive wheels 21 passively increases. In doing so, a wheel load necessary at the time of a maximum load weight need not be constantly continuously generated. Therefore, the rail 3, the wheels, and the drive wheels 21 need not be worn down in a wasteful manner. And a hydraulic actuator or the like which measures a load weight and actively generates a wheel load in accordance with the load weight need not be used. As a result, the drive device 6 can be simplified and lightened.

As shown in FIG. 19 and FIG. 20, when moving the cab 5 in the horizontal direction, a moment which causes the cab 5 to fall acts on the wheels and the drive wheels 21 of the first wheel-load equalizing link 22 on a side far from the cab 5. Due to the moment, a wheel load to the rail 3 acts. Therefore, only the drive wheels 21 on a side far from the cab 5 need to be driven.

In addition, an attitude of the car 4 is determined by the first set of a plurality of second left-right inclination prevention rollers 41, the second set of a plurality of second left-right inclination prevention rollers 41, and the third fore-aft inclination prevention roller 42. Therefore, even when the load weight of the cab 5 is biased, the cab 5 can be moved in the vertical direction or the horizontal direction.

Furthermore, the first wheel-load equalizing link 22 is rotatably supported by the support plate 43. Therefore, a wheel load which acts on the wheels and the drive wheels 21 can be averaged. As a result, the car 4 can readily pass a step difference or a clearance generated in a joint portion of the rail 3, between the divided rail 3*a* or the like and the rail 3, and the like.

Note that, in the third embodiment, while a depth dimension of the drive device 6 increases as compared to the first embodiment, the self-servo link 24 can be deleted. Therefore, dimensions of the rotating plate 20 can be reduced. As a result, the drive device 6 can be simplified.

Next, a first modification will be described with reference to FIG. 21.

Figure 21:
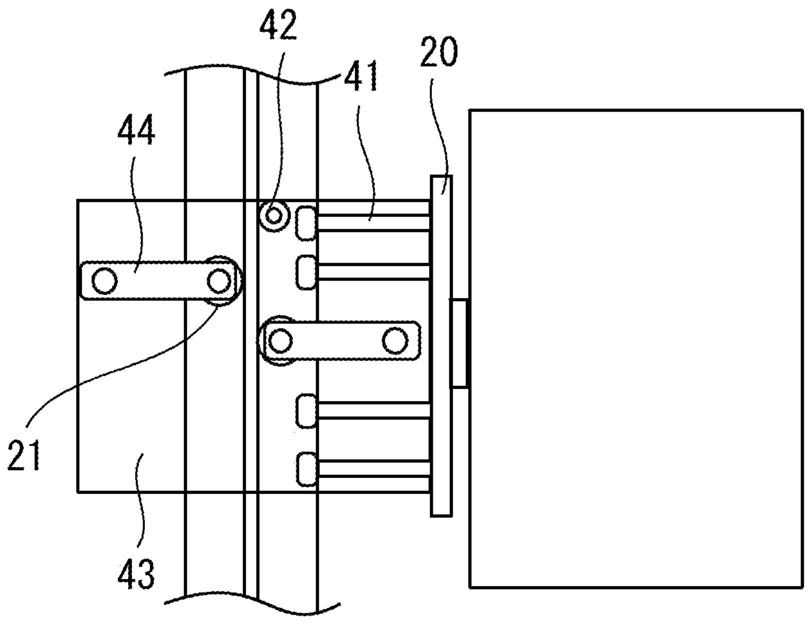
FIG. 21 is a side view of a first modification of the drive device for a self-propelled elevator according to the third embodiment.

FIG. 21 is a side view of the first modification of the drive device for a self-propelled elevator according to the third embodiment.

As shown in FIG. 21, the drive device 6 has wheels, drive wheels 21, and a pair of wheel fixing links 44.

The wheels are positioned on a side of the one of the pair of guide surfaces 11 on a side near to the car 4. The drive wheels 21 are positioned on a side of the other of the pair of guide surfaces 11 on a side far from the car 4.

One of the pair of wheel fixing links 44 is positioned on a side of the one of the pair of guide surfaces 11 on a side far from the car 4. The one of the pair of wheel fixing links 44 rotatably supports the drive wheels 21. In the one of the pair of wheel fixing links 44, one end on an opposite side to the rail 3 is fixed to the support plate 43.

The other of the pair of wheel fixing links 44 is positioned on a side of the other of the pair of guide surfaces 11 on a side near to the car 4. The other of the pair of wheel fixing links 44 is arranged at a position lower than the one of the pair of wheel fixing links 44. The other of the pair of wheel fixing links 44 rotatably supports the drive wheels 21. In the other of the pair of wheel fixing links 44, one end on an opposite side to the rail 3 is fixed to the support plate 43.

According to the first modification described above, the drive device 6 has wheels, drive wheels 21, and a pair of wheel fixing links 44. Therefore, the drive device 6 can be further simplified and lightened.

Fourth Embodiment

Figure 22:
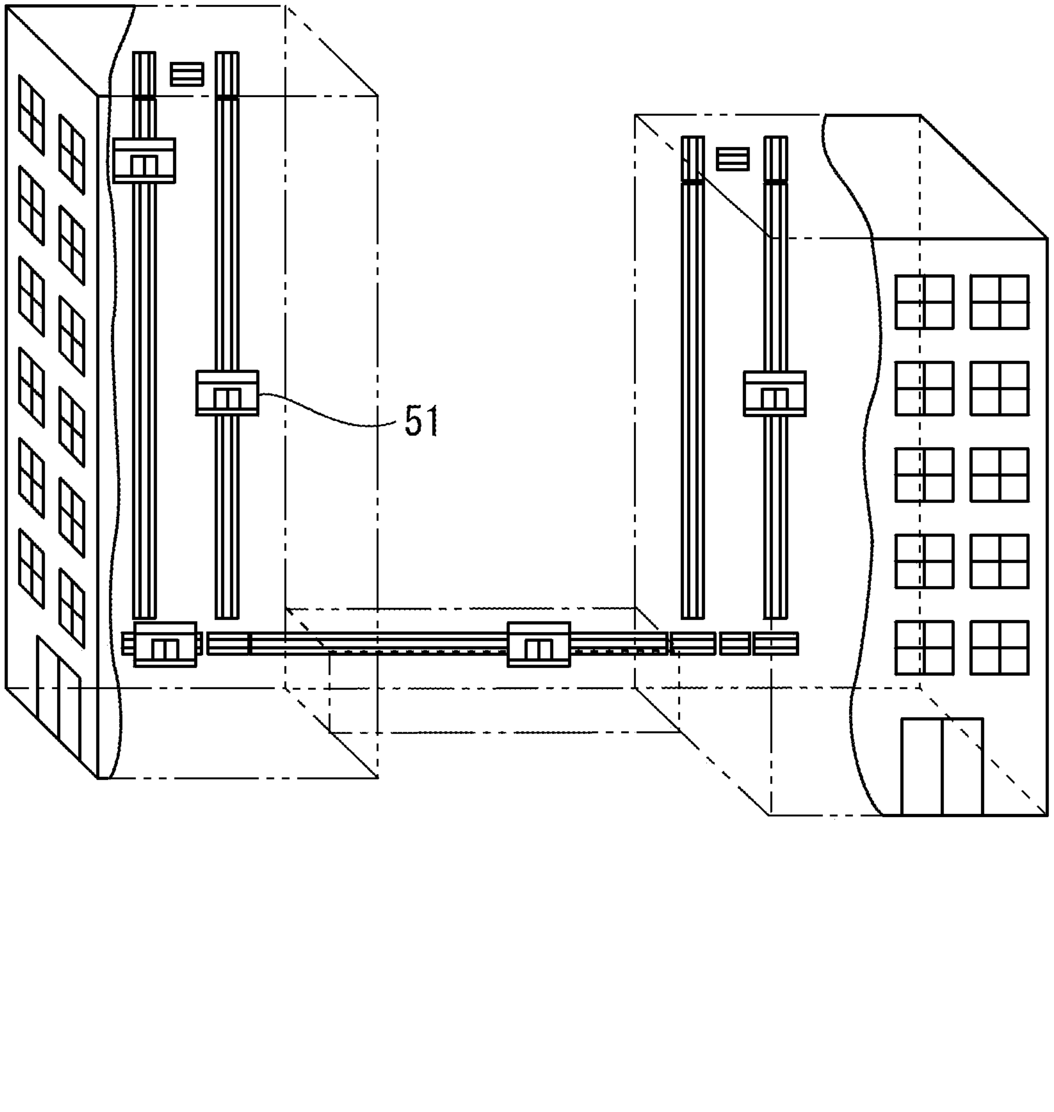
FIG. 22 is a perspective view of an elevator system to which a drive device for a self-propelled elevator according to a fourth embodiment is applied.

FIG. 22 is a perspective view of an elevator system to which a drive device for a self-propelled elevator according to a fourth embodiment is applied. Portions that are the same or equivalent to portions of the first embodiment will be denoted by same reference signs. Descriptions of such portions will be omitted.

In the fourth embodiment, a long rail is provided for movement in the horizontal direction. The rail straddles a first building and a second building which are provided at positions separated from each other.

Next, the car 4 will be described with reference to FIG. 23.

Figure 23:
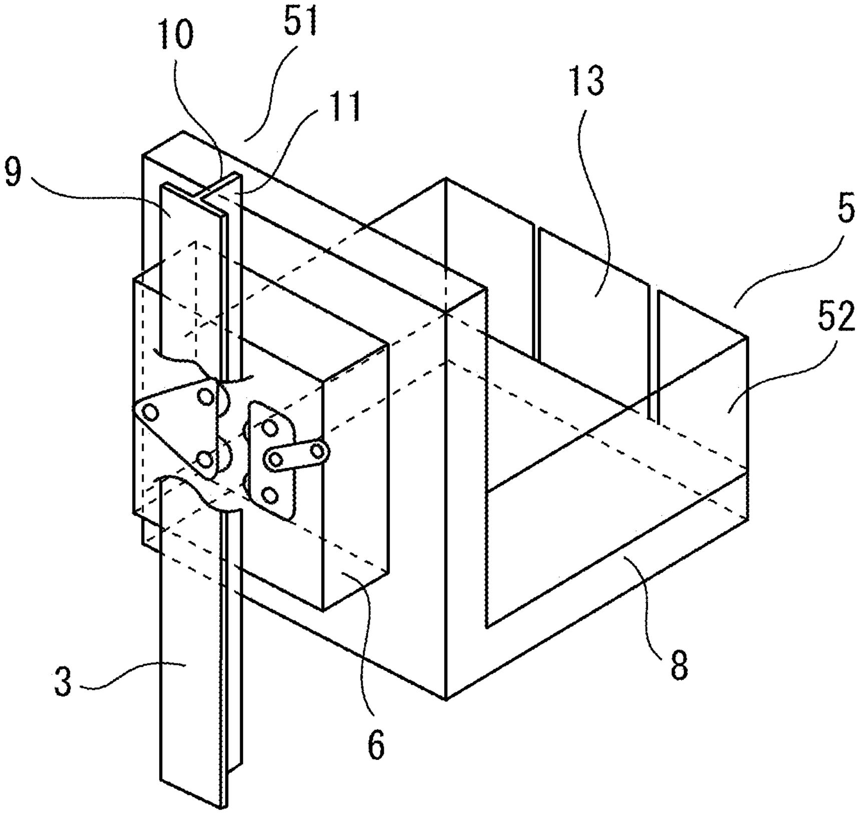
FIG. 23 is a perspective view of a car of a self-propelled elevator according to the fourth embodiment.

FIG. 23 is a perspective view of a car of a self-propelled elevator according to the fourth embodiment.

When the car 4 is used as a carrier device 51, a situation where only freight is carried is taken into account. In this case, the cab 5 does not have a ceiling. For example, the cab 5 has a wall or a fence 52 of which a height is midway up the wall of the cab 5 according to the first to third embodiments.

According to the fourth embodiment described above, the car 4 is used as a carrier device. In this case, acceleration during movement of the cab 5 can be increased. Therefore, a speed of movement of the cab 5 in the vertical direction and the horizontal direction can be increased. As a result, freight can be carried in a short amount of time between a plurality of buildings such as those shown in FIG. 22.

Note that freight may be enabled to be carried among three or more buildings such as hotels and large-scale facilities.

In addition, a transport robot is also conceivable as a carrier device. The transport robot autonomously moves in the horizontal direction using wheels. An object of the transport robot is to work together with people. Therefore, the transport robot moves while avoiding coming into contact with people. Furthermore, the transport robot moves at a low speed in order to suppress impact when coming into contact with people. Although the transport robot is capable of moving through any place, the transport robot moves at a lower speed when a position of a vicinity of a destination or the like needs to be comprehended in detail.

In contrast, in the elevator system according to the fourth embodiment, while places where the cab 5 can move are limited, the cab 5 has a dedicated movement space and rails. Therefore, the cab 5 can move at a higher speed than a transport robot. In addition, the need to decelerate in order to comprehend a position of the cab 5 or the like can be eliminated.

Next, a first modification will be described with reference to FIG. 24.

Figure 24:
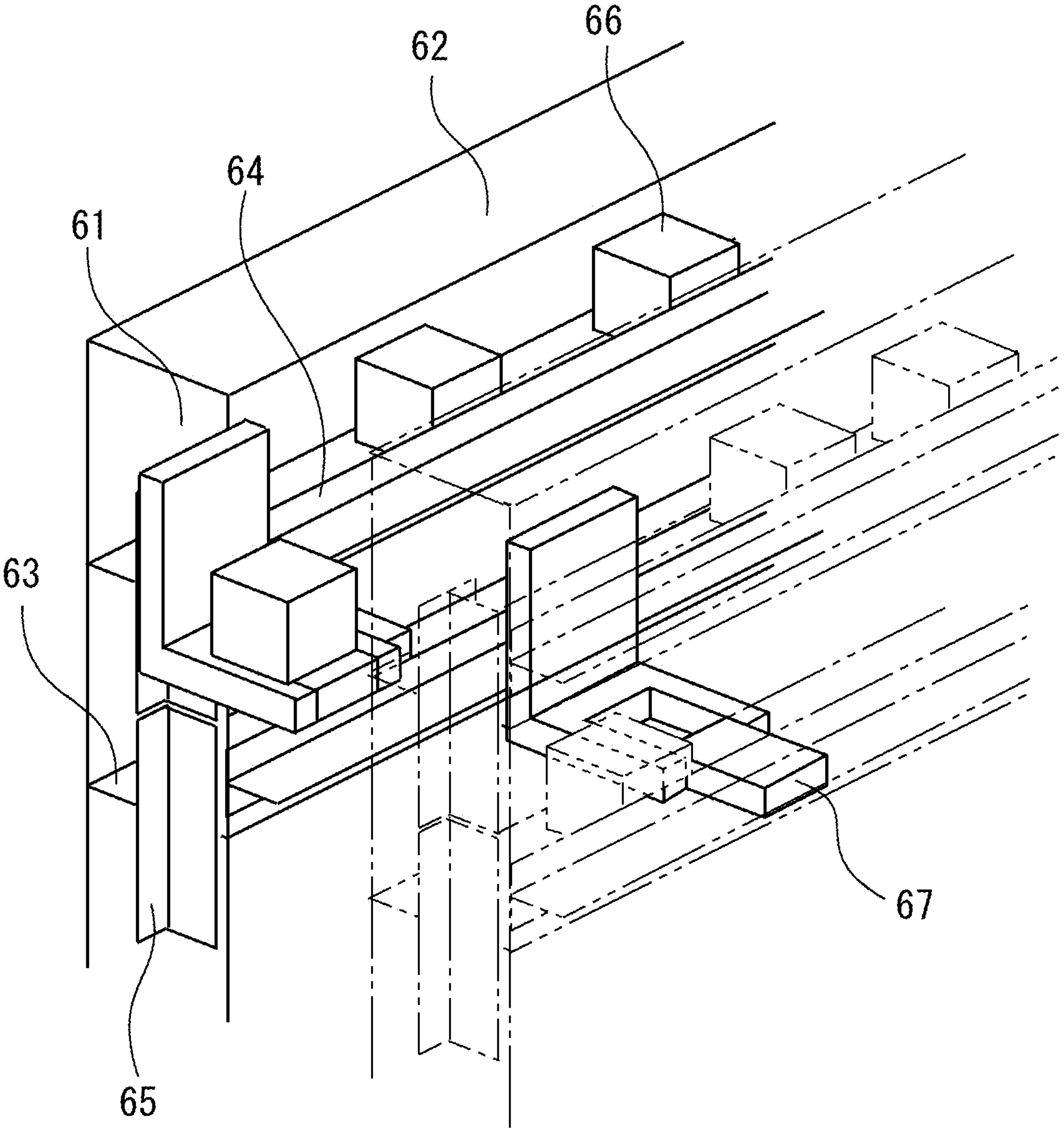
FIG. 24 is a perspective view of a substantial part of a first modification of the elevator system to which the drive device for a self-propelled elevator according to the fourth embodiment is applied.

FIG. 24 is a perspective view of a substantial part of an elevator system to which the drive device for a self-propelled elevator according to the fourth embodiment is applied.

FIG. 24 shows an interior of a warehouse. In the warehouse, a plurality of shelves 62 are arranged adjacent to each other. In each of the plurality of shelves 62, a plurality of shelf boards 63 are provided aligned in the vertical direction. The plurality of shelf boards 63 are parallel to each other. A piece of freight 66 is stored in a state of being placed on a shelf board 63.

A plurality of rails 64 are provided on a back face side of the shelves 62 so as to correspond to the plurality of shelf boards 63. Each of the plurality of rails 64 is positioned parallel to each of the plurality of shelf boards 63. A plurality of divided rails 65 are provided on both sides of the plurality of shelves 62. Although not illustrated, a rail for horizontal movement is adjacent to the divided rail 65 which is present at a lowermost position.

A carrier device 61 has a freight receiving unit 67. The carrier device 61 is guided by the rails 64 and moves to a position of the piece of object freight 66. Subsequently, the carrier device 61 moves the freight receiving unit 67 back and forth and takes the piece of freight 66 from the shelf board 63. Subsequently, the carrier device 61 is guided by the rails 64, the divided rail 65, and the rail for horizontal movement and carries the piece of freight 66 to a designated location.

According to the first modification described above, the shelves 62 are used as a wall for fixing the rail 3. Therefore, the carrier device 61 can be used even in a spacious warehouse.

An example of a device for placing the piece of freight 66 on a shelf or retrieving the piece of freight 66 from a shelf in a similar arrangement of shelves is a stacker crane. In the stacker crane, a vehicle unit moves along a rail positioned between shelves. A loading platform moves up and down along columns installed in the vehicle unit. The stacker crane is capable of delivering and receiving freight to and from the shelves on both sides.

However, one or a small number of dedicated stacker cranes are to be positioned for each rail along which the stacker cranes are to move. Therefore, the number of stacker cranes that operate at the same time is limited.

In contrast, by deploying a large number of the carrier devices 61, the number of carrier devices 61 that operate at the same time can be increased. As a result, pieces of freight 66 can be carried in an efficient manner.

INDUSTRIAL APPLICABILITY

As described above, the drive device for a self-propelled elevator according to the present disclosure can be used in an elevator system.

DESCRIPTION OF REFERENCE SIGNS

1 Elevator
2 Hoistway
3 Rail
3*a* Divided rail
3*b* Divided rail
3*c* Divided rail
3*d* Divided rail
3*e* Horizontal rail
3*f* Horizontal rail
3*g* Upper divided rail
3*h* Lower divided rail
3*i* Upper divided rail
3*j* Lower divided rail
3*k* Upper horizontal rail
31 Lower horizontal rail
4 Car
5 Cab
6 Drive device
7 Control unit
8 Car platform
9 Bottom panel
10 Guide plate
11 Guide surface
12 Bearing
13 Car door
20 Rotating plate
21 Drive wheel
22 First wheel-load equalizing link
23 Second wheel-load equalizing link

24 Self-servo link
25 First left-right inclination prevention roller
26 First fore-aft inclination prevention roller
27 Spring
28 Second fore-aft inclination prevention roller
29 Spring
30 Stationary link
31 Second rotating plate
32 Third rotating plate
41 Second left-right inclination prevention roller
42 Third fore-aft inclination prevention roller
43 Support plate
44 Wheel fixing link
51 Carrier device
52 Wall or fence
61 Carrier device
62 Shelf
63 Shelf board
64 Rail
65 Divided rail
66 Freight
67 Freight receiving unit

The invention claimed is:

1. A carrier device, comprising:

a rotating body which is rotatably coupled to a back face of a cab;

wheels which are provided on the rotating body so as to sandwich guide surfaces of a rail on a back face side of the cab, wherein at least one of the wheels is a driving wheel that generates, by friction between the driving wheel and the rail, a force that moves the cab in a vertical direction when a longitudinal direction of the rail is the vertical direction, and the driving wheel generates, by a friction force between the driving wheel and the rail, a force that moves the cab in a horizontal direction when the longitudinal direction of the rail is the horizontal direction;

a first left-right inclination prevention roller which is in contact with the guide surfaces of the rail;

a link which is rotatably supported by the rotating body and which rotatably supports the first left-right inclination prevention roller;

an elastic body which is coupled to the link and the rotating body;

a first fore-aft inclination prevention roller which is supported by the rotating body in a state of being in contact with a side far from the cab of a bottom panel of the rail, wherein the bottom panel is intersected by one of the guide surfaces; and a second fore-aft inclination prevention roller which is supported by the rotating body in a state of being in contact with a tip of a guide plate of the rail, wherein a surface of the second fore-aft inclination prevention roller in contact with the tip of the guide plate is intersected by the guide plate.

2. The carrier device according to claim 1, wherein the wheels are provided in plurality, one part of the plurality of wheels is provided on a side of another of the guide surfaces of the rail, and another part of the plurality of wheels is provided on a side of one of the guide surfaces of the rail, comes into contact with the one of the guide surfaces when the longitudinal direction of the rail is the horizontal direction, and generates, by a friction force with the rail, a force which moves the cab in the horizontal direction.

3. The carrier device according to claim 2, further comprising:

a wheel support link which is supported by the rotating body on the side of the one of the guide surfaces of the rail and which rotatably supports the other part of the plurality of wheels; and a self-servo link which is supported by the rotating body on the side of the other of the guide surfaces of the rail so as to be diagonally positioned at an angle of 45 degrees or less with respect to the horizontal direction when the cab moves in the vertical direction and which rotatably supports the one part of the plurality of wheels.

4. The carrier device according to claim 3, wherein the wheel support link is a link which is rotatably supported by the rotating body or a link which is fixed by the rotating body.

5. The carrier device according to claim 3, further comprising:

a link which rotatably supports the one part of the plurality of wheels and which is rotatably supported by the self-servo link.

6. The carrier device according to claim 3, wherein the self-servo link directly rotatably supports the one part of the plurality of wheels.

7. The carrier device according to claim 1, wherein a plane of the guide surfaces of the rail intersects the back face side of the cab.

8. A carrier device comprising:

a rotating body which is rotatably coupled to a back face of a cab;

a plurality of wheels which are provided on the rotating body on a back face side of the cab so that a first wheel of the plurality of the wheels provided on a side of one of guide surfaces of a rail and a second wheel of the plurality of the wheels provided on a side of another of the guide surfaces of the rail sandwich the guide surfaces of the rail, wherein at least one of the plurality of wheels is a driving wheel that generates by friction between the driving wheel and the rail, a force that moves the cab in a vertical direction when a longitudinal direction of the rail is the vertical direction, and the driving wheel comes into contact with the one of the guide surfaces and generates, by a friction force between the driving wheel and the rail, a force that moves the cab in a horizontal direction when the longitudinal direction of the rail is the horizontal direction;

a backing body which extends from the rotating body in a direction of separation with respect to the cab;

a first wheel support link which is provided on the backing body on a side of a guide surface on a side far from the cab with respect to the rail and which rotatably supports the first wheel of the plurality of wheels; and a second wheel support link which is provided on the backing body on a side of a guide surface on a side near to the cab with respect to the rail so that the highest point of the second wheel support link is arranged at a position lower than the lowest point of the first wheel support link when the longitudinal direction of the rail is the vertical direction and which rotatably supports the second wheel of the plurality of wheels, wherein wheels on a side of the first wheel support link are driven when the cab moves in the horizontal direction.

9. The carrier device according to claim 8, wherein the second wheel support link is a link which is rotatably supported by the backing body or a link which is fixed by the backing body.

10. The carrier device according to claim 9, further comprising:

a first set of a plurality of second left-right inclination prevention rollers which is provided on the backing body and which comes into contact with one surface of a bottom panel on a side of the cab in the rail;

a second set of a plurality of second left-right inclination prevention rollers which is provided on the backing body and which comes into contact with another surface of the bottom panel on the side of the cab in the rail; and a third fore-aft inclination prevention roller which is provided on the backing body at a position at a same height as the wheels in an uppermost portion on the side far from the cab or a position higher than the wheels in the uppermost portion on the side far from the cab at all times when the longitudinal direction of the rail is the vertical direction, and which comes into contact with the guide surface on a side near to the cab in the rail.

11. The carrier device according to claim 8, further comprising:

a first set of a plurality of second left-right inclination prevention rollers which is provided on the backing body and which comes into contact with one surface of a bottom panel on a side of the cab in the rail;

a second set of a plurality of second left-right inclination prevention rollers which is provided on the backing body and which comes into contact with another surface of the bottom panel on the side of the cab in the rail; and a third fore-aft inclination prevention roller which is provided on the backing body at a position at a same height as the wheels in an uppermost portion on the side far from the cab or a position higher than the wheels in the uppermost portion on the side far from the cab at all times when the longitudinal direction of the rail is the vertical direction, and which comes into contact with the guide surface on a side near to the cab in the rail.

12. A carrier device, comprising:

a rotating body which is a pair of divided bodies respectively rotatably coupled to a back face of a cab;

wheels which are provided on the rotating body so as to sandwich guide surfaces of a rail on a back face side of the cab, wherein at least one of the wheels is a driving wheel that generates, by friction between the driving wheel and the rail, a force that moves the cab in a vertical direction when a longitudinal direction of the rail is the vertical direction, and the driving wheel generates, by a friction force between the wheels and the rail, a force that moves the cab in a horizontal direction when the longitudinal direction of the rail is the horizontal direction;

a first left-right inclination prevention roller which is in contact with the guide surfaces of the rail;

a link which is rotatably supported by one of the pair of divided bodies and which rotatably supports the first left-right inclination prevention roller;

an elastic body which is coupled to the link and the one of the pair of divided bodies;

a first fore-aft inclination prevention roller which is supported by the other of the pair of divided bodies in a state of being in contact with a side far from the cab of a bottom panel of the rail, wherein the bottom panel is intersected by one of the guide surfaces; and a second fore-aft inclination prevention roller which is supported by the one of the pair of divided bodies in a state of being in contact with a tip of a guide plate of the rail, wherein a surface of the second fore-aft inclination prevention roller in contact with the tip of the guide plate is intersected by the guide plate.

13. The carrier device according to claim 12, wherein the wheels are provided in plurality, one part of the plurality of wheels is provided on a side of another of the guide surfaces of the rail, and another part of the plurality of wheels is provided on a side of one of the guide surfaces of the rail, comes into contact with the one of the guide surfaces when the longitudinal direction of the rail is the horizontal direction, and generates, by a friction force with the rail, a force which moves the cab in the horizontal direction.

14. The carrier device according to claim 13, further comprising:

a wheel support link which is supported by the rotating body on the side of the one of the guide surfaces of the rail and which rotatably supports the other part of the plurality of wheels; and a self-servo link which is supported by the rotating body on the side of the other of the guide surfaces of the rail so as to be diagonally positioned at an angle of 45 degrees or less with respect to the horizontal direction when the cab moves in the vertical direction and which rotatably supports the one part of the plurality of wheels.

15. The carrier device according to claim 14, wherein the wheel support link is a link which is rotatably supported by the rotating body or a link which is fixed by the rotating body.

16. The carrier device according to claim 14, further comprising:

a link which rotatably supports the one part of the plurality of wheels and which is rotatably supported by the self-servo link.

17. The carrier device according to claim 14, wherein the self-servo link directly rotatably supports the one part of the plurality of wheels.

* * * * *